INVENTOR.
LUTHER L. GENUIT

June 30, 1970 L. L. GENUIT 3,518,526
SWITCHING REGULATOR
Filed Dec. 16, 1968 3 Sheets-Sheet 3
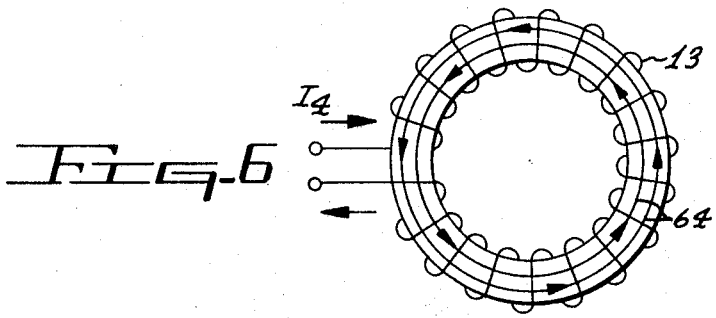
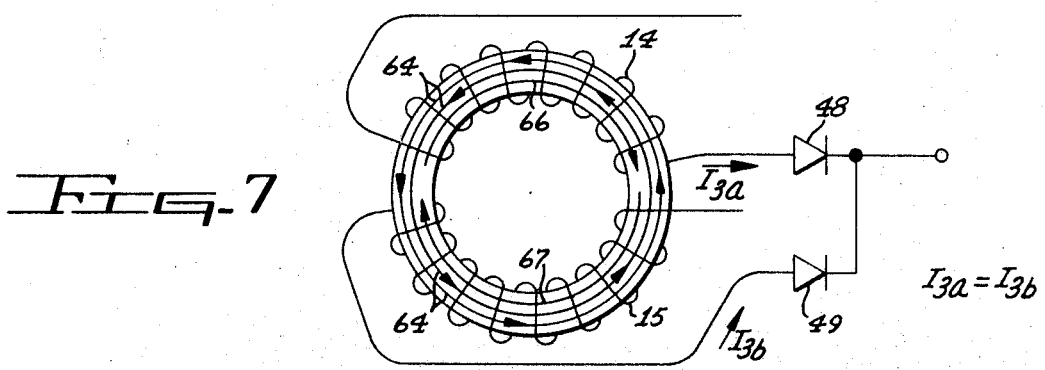
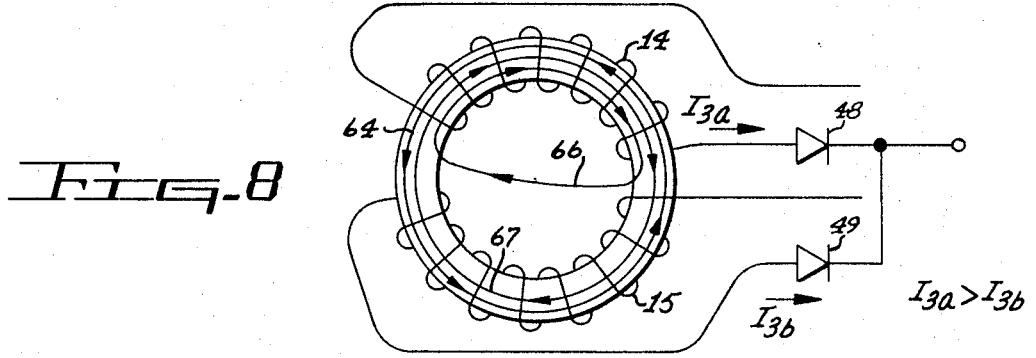
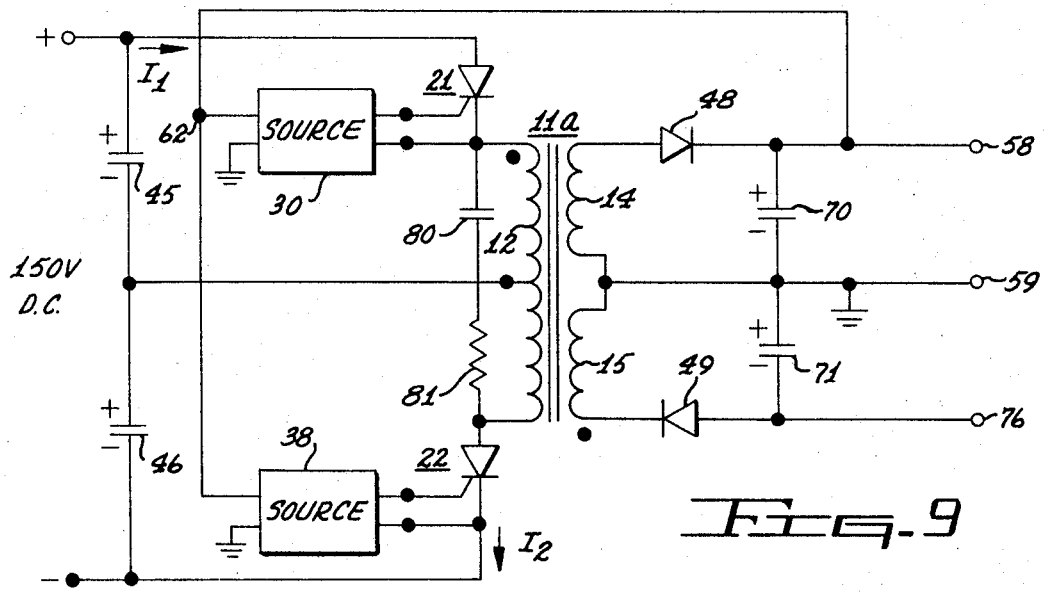

United States Patent Office 3,518,526
Patented June 30, 1970

3,518,526
SWITCHING REGULATOR
Luther L. Genuit, Scottsdale, Ariz., assignor to General Electric Company, a corporation of New York
Substituted for abandoned application Ser. No. 591,204, Nov. 1, 1966. This application Dec. 16, 1968, Ser. No. 786,823
Int. Cl. H02m 1/08, 3/22, 7/44
U.S. Cl. 321—2
14 Claims

ABSTRACT OF THE DISCLOSURE

A pair of silicon controlled rectifiers, a power transformer and a diode convert a relatively large value of unregulated D.C. voltage to a relatively small value of regulated D.C. voltage.

---

This invention relates to power supplies and more particularly to power supplies of the switching regulator type which are designed to supply a regulated D.C. voltage.

In high speed data processing systems, microcircuits are used to reduce the physical size of the system and to increase the operating speed. These microcircuits are built in modules each of which may replace a large number of circuits using discrete circuit components. Each of these microcircuit modules requires as much power as several circuits using discrete components so that the power required in a single cabinet of a data processing system using microcircuit modules is several times as large as the power required in a single cabinet of a system using the discrete components when the two cabinets have the same physical size. In addition, high speed microcircuits usually use a much smaller value of D.C. voltage than circuits employing discrete components. For example, in many high speed microcircuits the required D.C. voltage may be less than one volt. This voltage must be well regulated to provide a constant value of D.C. voltage for the microcircuits, otherwise variations in D.C. voltage may produce error signals in the data processing system.

The power supplied to any system is the product of the voltage and current so that a power distribution system must supply either a large value of current at a relatively small value of voltage or a smaller value of current at a relatively large value of voltage in order to provide a large amount of power. In prior art power supplies, power from a 220 volt A.C. line is converted into a relatively small value of D.C. voltage and large amounts of current are distributed by large conductors or "bus" bars to various portions of the data processing system. The voltage drop in each bus bar is proportional to the amount of current in the bus bar so that the value of voltage supplied to each portion of the data processing system varies as the current supplied to that portion varies. This variation in voltage may produce error signals in the data processing system.

Another disadvantage of the prior art power supplies is that the efficiency of these supplies is very low. These power supplies usually include a constant voltage transformer and a rectifier which convert the A.C. voltage to a D.C. voltage, and a series regulator which reduces the D.C. voltage to a small but constant value. In such a system the voltage drop in the constant voltage transformer, the rectifier and the series regulator is usually about 5–6 volts while the output voltage necessary for the microelectronic circuits is about 1 volt. This means that the transformer must deliver approximately 6 to 7 times the power which is used by the microcircuit so that the overall efficiency of the power supply is less than 20 percent thereby causing the power supply to be bulky and expensive. Because of the large size, these power supplies are usually mounted in a separate cabinet and require long bus bars to distribute the current to the other portions of the data processing system. These long bus bars cause severe variations in voltage when current in the bus bars varies.

Still another disadvantage of the prior art power supplies is that excessively large values of current drawn from the power supply can cause damage to the series regulator and other parts of the power supplies. Also a short circuit in the series regulator may cause a large value of voltage to be supplied to the microcircuit modules. This large value of voltage can cause damage to the microcircuit modules.

The present invention alleviates the disadvantage of the prior art by converting the A.C. voltage to a relatively large value of unregulated D.C. voltage. This D.C. is distributed at a relatively high voltage but low current to various portions of the data processing system thereby allowing the use of relatively small conductors. A "stand by" power supply comprising a plurality of batteries can be employed to supply the relatively large value of D.C. voltage in the event of a failure of the voltage on the A.C. line. This relatively large value of unregulated D.C. voltage can be converted to a relatively small value of regulated D.C. voltage by switching regulators which are positioned at a plurality of locations in the data processing system. The switching regulator has an efficiency which is several times the efficiency of prior art power supplies employing series regulators thereby causing the physical size of the switching regulator to be relatively small and allowing the switching regulator to be positioned near the microcircuit modules.

The switching regulator of the instant invention employs a transformer, a pair of silicon controlled rectifiers and a pair of signal sources to convert an unregulated D.C. voltage, such as 150 volts to an accurately regulated D.C. voltage, such as 1 volt. The silicon controlled rectifiers are employed as switches between the source of unregulated D.C. voltage and the transformer. The silicon controlled rectifiers are located on the "high" voltage side of the transformer where the current and the power losses in these rectifiers are low thereby causing the switching regulator to have a high degree of efficiency. The regulated D.C. voltage is obtained from a secondary winding on the transformer. The transformer provides isolation between the regulated D.C. voltage and the source of unregulated D.C. voltage so that a short circuit in the silicon controlled rectifiers will not cause damage to the microcircuit modules which provides the load on the switching regulator. The silicon controlled rectifier is a semiconductor device having an anode, a cathode and a gate. The silicon controlled rectifier can be used as an ON-OFF switch which can be turned on in a very few microseconds. Normally the silicon controlled rectifier cannot conduct current between anode and cathode thereof until a pulse of current larger than a threshold value flows from gate to cathode. If a positive voltage difference exists between the anode and the cathode when the pulse of current flows in the gate, the silicon controlled rectifier "fires" i.e., is rendered conductive, and a current will flow from the anode to the cathode. The rate at which current flow from anode to cathode increases when the silicon controlled rectifier fires must be limited to prevent damage to the rectifier. Once anode-cathode flow commences, the gate has no further control over such current flow. Current flow from anode to cathode in the rectifier can be terminated only by reducing the anode to cathode current below a "holding" or minimum current value. A more detailed description of the operation of a silicon controlled rectifier can be found in the Silicon Controlled Rectifier Manual, 3rd ed., 1964, published by the General Electric Company, Auburn, N.Y.

It is therefore an object of this invention to provide an improved switching regulator.

Another object of this invention is to provide a switching regulator having improved efficiency.

Still another object of this invention is to provide a switching regulator having electrical isolation between the input and the output circuits.

A further object of this invention is to provide a switching regulator which prevents excessive output currents from causing damage to the regulator components.

A still further object of this invention is to provide a switching regulator which eliminates excessively large values of output voltages which may cause damage to a load circuit connected to the regulator.

The foregoing objects are achieved in the instant invention by providing a new and improved switching regulator which increases the efficiency of the power supply by employing a pair of silicon controlled rectifiers and a transformer having a center tapped primary winding and a secondary winding. The silicon controlled rectifiers are each connected between the primary winding and a source of unregulated D.C. voltage. A secondary winding of the transformer is connected to a diode and a filter circuit. A pair of signal sources are employed to selectively turn on the controlled rectifiers for a fixed period of time so that a fixed quantity of energy is transferred from the source of unregulated D.C. voltage through the transformer to the filter circuit each time a signal source supplies a signal to one of the silicon controlled rectifiers. The signal sources are connected to the filter circuit and the voltage across the filter circuit controls the frequency of the signal from the signal sources so that the voltage across the filter circuit is constant over a wide range of values of current supplied to a load by the filter circuit. The transformer provides isolation between the source of unregulated D.C. voltage and the filter circuit. The upper frequency of the signal sources is limited and the total quantity of energy transferred from the source of unregulated D.C. voltage is limited so that a short circuit in the filter circuit will not cause excessive currents in the regulator.

Other objects and advantages of this invention will become apparent from the following description when taken in connection with the accompanying drawings wherein:

FIGS. 6–8 illustrate the construction of the transformer shown in FIG. 1;

FIG. 9 is a schematic diagram of another embodiment of the instant invention.

Figure 1:
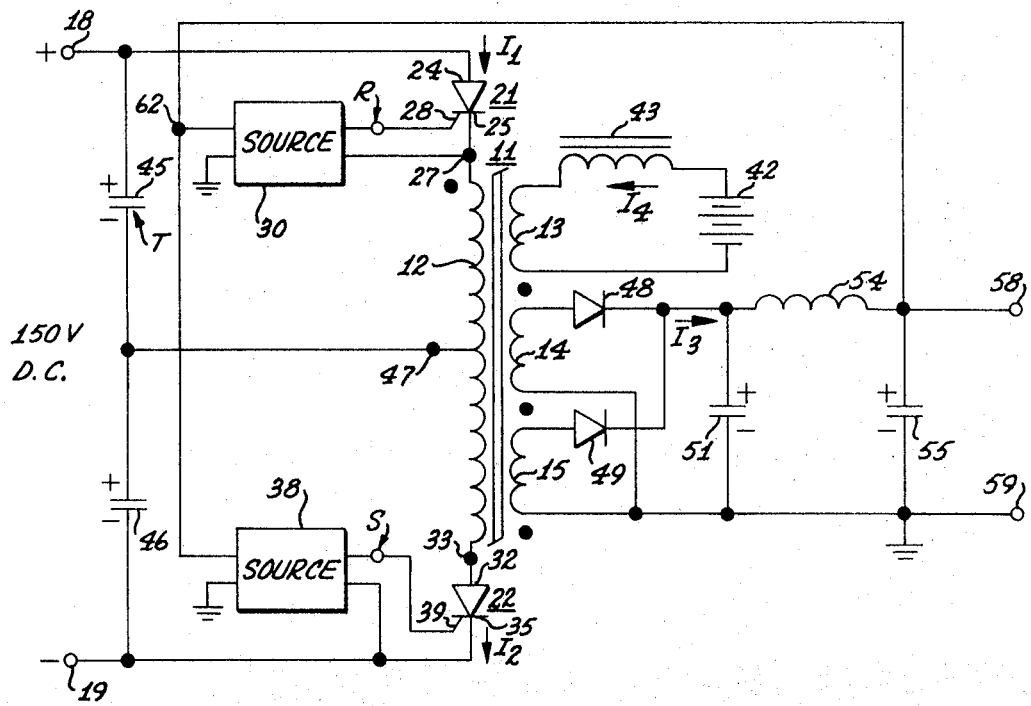
FIG. 1 is a schematic diagram of one embodiment of the instant invention.

Referring more particularly to the drawings by the characters of reference, FIG. 1 discloses a switching regulator which is designed to provide a constant value of D.C. output voltage for a wide range of values of output current. As indicated in FIG. 1, a transformer 11 comprising a primary winding 12 having a center tap, and a plurality of secondary windings 13, 14 and 15 is coupled to a high voltage D.C. power supply having a positive output terminal 18 and a negative output terminal 19. A pair of silicon controlled rectifiers 21 and 22 controls the current supplied by the power supply to the primary winding of the transformer 11. An anode 24 of silicon controlled rectifier 21 is connected to the positive terminal 18 of the high voltage power supply and a cathode 25 of the silicon controlled rectifier 21 is connected to a terminal 27 of the primary winding 12. Gate 28 of the silicon controlled rectifier 21 and cathode 25 are connected to a first signal source 30 which provides signal pulses to render rectifier 21 conductive. The anode 32 of silicon controlled rectifier 22 is connected to a terminal 33 of the primary winding 12 and cathode 35 of silicon controlled rectifier 22 is connected to the negative terminal 19 of the high voltage power supply. A second signal source 38 is connected between gate 39 and cathode 35 of silicon controlled rectifier 22 to provide signal pulses to render rectifier 22 conductive.

Figure 3:
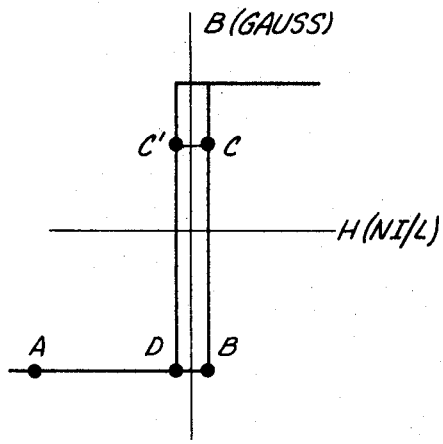
FIGS. 3 and 4 illustrate magnetization curves which are useful in explaining the operation of the circuit shown in FIG. 1.

A saturable core employed in transformer 11 produces the magnetization characteristics illustrated in the magnetization curve of FIG. 3. The magnetizing force, H is equal to the product of the number of turns of wire in a winding on the transformer core and the number of amperes of current through these turns of wire divided by the length of the core. Since the physical length of a particular transformer core is constant, the magnetizing force of a transformer is often expressed as the number of amperes times the number of turns or "ampere-turns." The flux density B is the number of lines of flux per square centimeter of the transformer core and is determined by the value of the magnetizing force and the type of material used in the core. A discussion of the magnetization curves can be found in the textbook Magnetic Circuits and Transformers by E. E. Staff, M.I.T. 1943 published by John Wiley & Sons, New York, N.Y.

Figure 4:
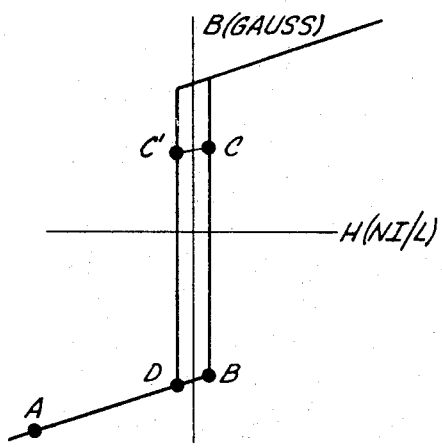

A transformer having only a saturable core can be used in the circuit shown in FIG. 1, but the sudden change from a saturated condition to an unsaturated condition at points B and D of the magnetization curve of FIG. 3 causes the generation of electrical noise in the filter circuit. This noise can produce error signal in a data processing system which may be connected to the filter circuit. The horizontal portion of the magnetization curve between points A and B also causes the current in the primary winding 12 to increase very rapidly when silicon controlled rectifier 21 or silicon controlled rectifier 22 is rendered conductive. This rapid increase in current may cause damage to the silicon controlled rectifiers. The amount of noise generated can be greatly reduced and the rate of increase of current in the primary winding 12 can be reduced by using a transformer 11 having a saturable core and a linear core placed side by side with the primary winding extending completely about both cores. The magnetization curve for this combination of a saturable and linear core is shown in FIG. 4. This magnetization curve of FIG. 4 is very similar to the magnetization curve of FIG. 3 except that between points A and B the curve has an appreciable amount of slope instead of being almost horizontal as shown in the curve of FIG. 3.

A bias power supply 42 provides a current through an inductor 43 and a bias secondary winding 13. Power supply 42 and seconding winding 13 are selected to provide a magnetizing force so that the saturable core is saturated and operating at point A of FIG. 4 when there is no current in the primary winding 12 of transformer 11.

Figure 5:
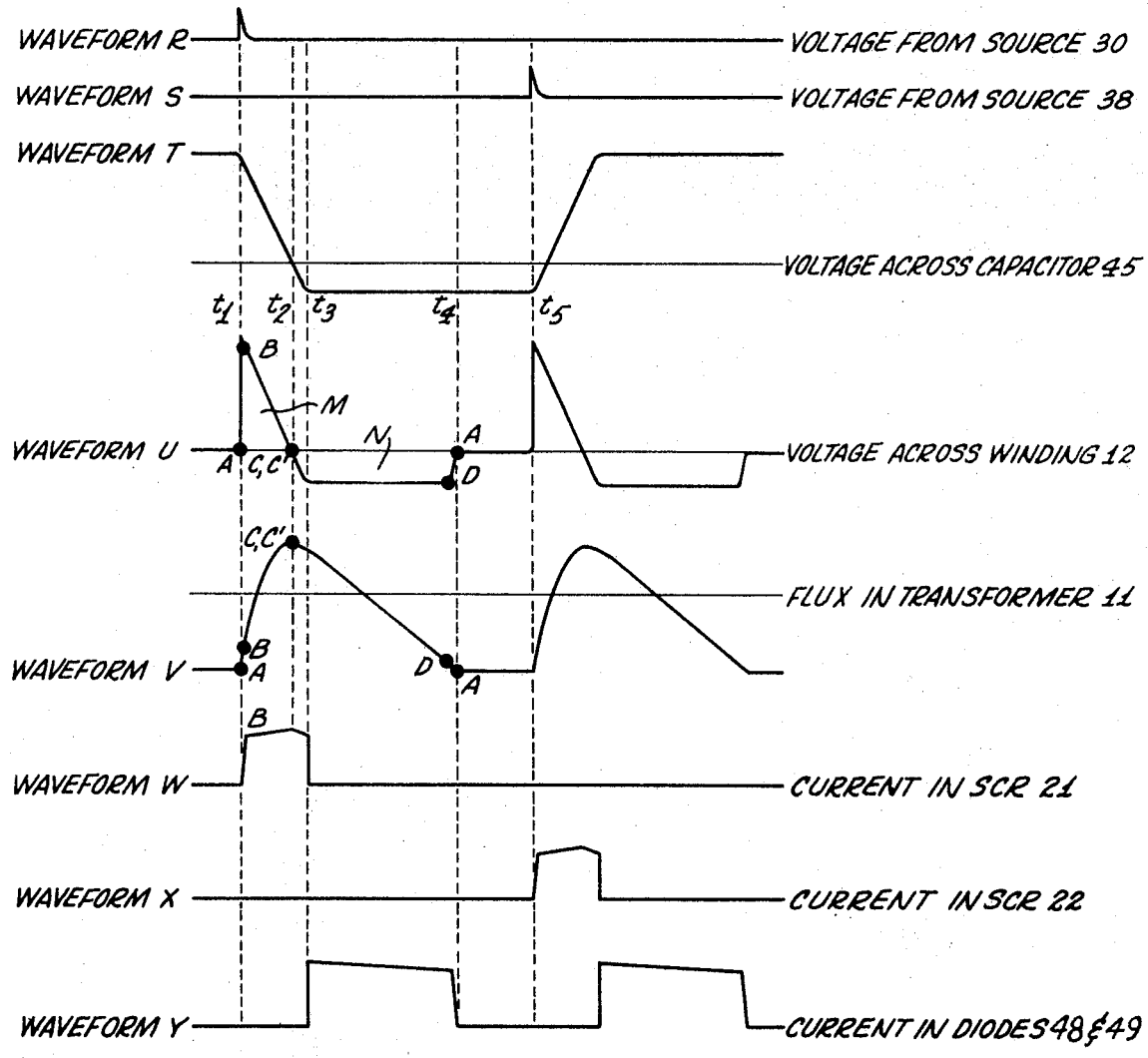
FIG. 5 illustrates waveforms which are useful in explaining the operation of the circuit shown in FIG. 1.

The operation of the circuit of FIG. 1 will now be discussed in connection with the magnetization curve shown in FIG. 4 and the waveforms shown in FIG. 5.

A pair of capacitors 45 and 46 provide predetermined quantities of energy to the transformer each time one of the silicon controlled rectifiers is rendered conductive. Prior to time $t_1$ shown in FIG. 5, capacitor 45 of FIG. 1 is charged to the polarity shown in FIG. 1. At time $t_1$ a pulse from signal source 30 renders silicon controlled rectifier 21 conductive so that the voltage across capacitor 45 is applied to the upper half of primary winding 12 causing a current $I_1$ to flow from the upper plate of capacitor 45 from anode 24 through cathode 25, the upper half of primary winding 12 to the lower plate of capacitor 45. Current $I_1$ through primary winding 12 causes a change in flux in the transformer core and causes the operating point to move from point A toward point B of the magnetization curve in FIG. 4. This change in flux produces a voltage across primary winding 12 which limits the rate of increase of current through silicon controlled rectifier 21 thereby preventing possible damage to rectifier 21. The operating point reaches point B when the ampere-turns in the primary winding 12 are approximately equal to the ampere-turns in the bias secondary winding 13. A positive voltage applied to the upper end of primary winding 12 causes the operating point to move upward from point B toward point C. The distance between point B and point C is proportional to the product of the voltage applied to primary winding 12 and the duration of time this voltage is applied. The substantially vertical slope of the curve between point B and point C shows that there is substantially no change in the current in the primary winding 12 as the operating point moves from point B to point C.

The voltage applied to the upper half of primary winding 12 is magnetically coupled through the transformer core to secondary windings 13, 14 and 15. Between time $t_1$ and time $t_2$ secondary windings 13, 14 and 15 each have a positive polarity of voltage at the lower end of the winding and a negative polarity of voltage at the upper end of the winding. This voltage across secondary winding 13 causes the current $I_4$ in inductor 43 to increase thereby storing energy in inductor 43. At the same time, the voltages across secondary windings 14 and 15 cause diodes 48 and 49 to be back biased so that no current flows through these diodes or through secondary windings 14 and 15. Capacitor 45 provides current $I_1$ until this capacitor has discharged at time $t_2$ as shown in waveform T of FIG. 5. The area M under the curve of waveform U (FIG. 5) between time $t_1$ and time $t_2$ is a sum of the products of the voltage applied to primary winding 12 and the duration of time the voltage is applied and this area M represents the total energy stored in inductor 43. When the voltage applied to primary winding 12 changes through the zero value at time $t_2$ the operating point moves from point C to point C'.

At time $t_2$, the energy stored in inductor 43 provides a current through secondary winding 13 which returns energy to the transformer and reverses the polarity of voltage across each of the transformer windings so that a negative polarity of voltage is developed at the upper end of primary winding 12. This negative polarity of voltage at the upper end of primary winding 12 causes the operating point in FIG. 4 to move from point C' toward point D. Again the distance between point C' and point D is proportional to the product of the voltage across the primary winding 12 and the duration of time the voltage is applied. The area N under the curve of waveform U between time $t_2$ and time $t_4$ is a sum of the products of the voltage across primary winding 12 and the time this voltage is applied and this area N represents the total energy which the inductor 43 returns to the transformer. This voltage across primary winding 12 causes current $I_1$ to charge capacitor 45 to a polarity opposite the polarity shown in FIG. 1.

As the energy from inductor 43 is returned to the transformer, the voltages across windings 14 and 15 increase to a value larger than the voltage across filter capacitor 51 so that a current $I_3$ flows through diodes 48 and 49 to charge capacitor 51. The value of capacitor 51 is several times as large as the value of capacitor 45 so current $I_3$ causes very little change in the value of voltage across capacitor 51. When current $I_3$ flows, this current through secondary windings 14 and 15 provides a flux which limits the rate of increase of the voltage across primary winding 12 so that current $I_1$ decreases below the holding current necessary to cause silicon controlled rectifier 21 to be conductive. Rectifier 21 is rendered nonconductive and the energy stored in inductor 43 is returned through the transformer to capacitors 51 and 55. When the currents in all of the transformer windings except bias secondary winding 13 decreases to a zero value, the operating point of the magnetization curve shifts from point D back to point A.

The energy which is stored in the inductor when silicon controlled rectifier 21 conducts is proportional to the difference between the flux at point A and point C on the magnetization curve of FIG. 4; and the energy which is transferred from the inductor through the transform to the output filter when silicon controlled rectifier 21 is nonconductive is proportional to the difference between the flux at point C' and point A. Since the distance between points A and C along the curve shown in FIG. 4 is substantially the same as the distance between points C' and A substantially all of the energy which was stored in inductor 43 between times $t_1$ and $t_2$ is returned through the transformer between times $t_3$ and $t_4$ and is stored in capacitors 51 and 55. Capacitor 45 delivers substantially the same amount of energy to the transformer each time the silicon controlled rectifier 21 is rendered conductive so that the amount of energy delivered to filter capacitors 51 and 55 and the voltage across these capacitors are determined by the frequency of the pulses applied to gate 28 of rectifier 21.

Capacitor 46 also provides a predetermined quantity of energy to the transformer each time silicon controlled rectifier 22 is rendered conductive. Prior to time $t_5$, capacitor 46 is charged to the polarity shown in FIG. 1. At time $t_5$, a pulse from signal source 38 renders silicon controlled rectifier 22 conductive so that a current $I_2$ flows from the upper plate of capacitor 46 through the lower half of primary winding 12 to anode 32 and cathode 35 to the lower plate of capacitor 46. Current $I_2$ through the lower half of primary winding 12 and the voltage impressed across this winding cause the operating point of the characteristic curve in FIG. 4 to move from point A to point B to point C and causes an increase in current $I_4$ to store a predetermined amount of energy in inductor 43. When silicon controlled rectifier 22 is rendered nonconductive, this energy is returned through the transformer and a current $I_3$ charges capacitor 51 as described above.

The amount of voltage across capacitors 51 and 55 can be controlled by controlling the frequency of the signal pulses which signal sources 30 and 38 apply to the gates of silicon controlled rectifiers 21 and 22. The frequency of these signal pulses is determined by the value of voltage applied to a control terminal 62. When an increase in the amount of current drawn by a load (not shown) connected across the output terminals 58 and 59 in FIG. 1 causes the value of voltage at control terminal 62 to fall below a predetermined reference level the frequency of the output pulses from signal sources 30 and 38 increases. This increase in the frequency of the output pulses causes an increase in the rate of energy delivered to the filter capacitors 51 and 55 and increases the voltage at control terminal 61 to the predetermined reference level. The voltage at output terminal 58 of the power supply controls the frequency of the pulses from signal sources 30 and 38 so that the voltage between output terminals 58 and 59 is substantially constant even when the current drawn from this power supply varies over a wide range of values.

Secondary windings 14 and 15 of transformer 11 are designed so that the amount of current produced in winding 14 is substantially the same as the amount of current produced in winding 15 even when diodes 48 and 49 have different operating characteristics. This feature permits the use of diodes having a relatively small current rating since the total amount of current $I_3$ is shared equally by these two diodes at all times. This equal sharing of current $I_3$ by windings 14 and 15 is caused by the method of winding the secondary windings 13, 14 and 15 on the transformer cores and is illustrated in FIGS. 6, 7 and 8. FIG. 6 illustrates the relative position of bias secondary winding 13 on the core of transformer 11 wherein winding 13 extends around the full length of the core. Current $I_4$ through winding 13 produces flux which is represented by the lines 64 running counterclockwise in the transformer core. The other windings of transformer 11 are not shown in this FIG. 6.

FIG. 7 illustrates the relative positions of secondary windings 14 and 15 on the core wherein each of these windings extends around substantially one-half of the length of the core. Currents $I_{3a}$ and $I_{3b}$ through windings 14 and 15 produce flux which is represented by lines 66 and 67 running clockwise in the core. When the value of current $I_{3a}$ is equal to the value of current $I_{3b}$ lines 66 and 67 extend around the entire core as shown in FIG. 7 so that the value of the voltage induced in winding 14 is the same as the value of the voltage induced in winding 15.

FIG. 8 illustrates the flux produced in the transformer core when current $I_{3a}$ increases to a value slightly greater than the value of current $I_{3b}$. Current $I_{3a}$ causes winding 14 to produce a larger amount of flux than the flux produced by current $I_{3b}$ through winding 15. This causes a portion of the flux produced by winding 14 to "leak" across from one side of the core to the other as shown by flux line 66 in FIG. 8. The larger amount of flux in winding 14 cancels a larger portion of the flux lines 64 produced by bias winding 13 so that the voltage produced in winding 14 is less than the voltage produced in winding 15 by the flux from bias winding 13. The lower value of voltage in winding 14 causes current $I_{3a}$ to decrease until the value of current $I_{3a}$ is substantially equal to the value of current $I_{3b}$.

Figure 2:
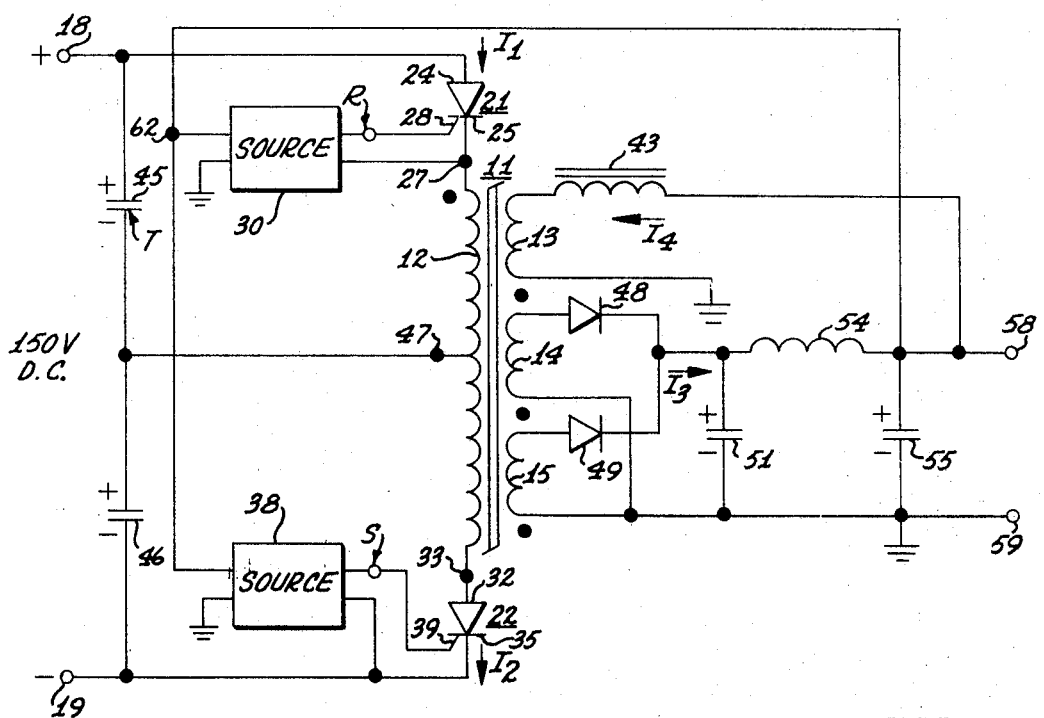
FIG. 2 is a schematic diagram of another embodiment of the instant invention.

FIG. 2 illustrates a second embodiment of the invention shown in FIG. 1 wherein like parts have similar reference characters. The circuit in FIG. 2 differs from the circuit of FIG. 1 in that the bias supply 42 has been removed and the voltage across capacitor 55 supplies the bias current $I_4$ through inductor 43 and bias winding 13.

FIG. 9 illustrates a third embodiment of the invention shown in FIG. 1 wherein like parts have similar reference characters. The circuit in FIG. 9 differs from the circuit of FIG. 1 in that it employs a transformer having only a linear core and does not employ a separate inductor to store energy. The energy from capacitors 45 and 46 which was stored in inductor 43 in the circuit of FIG. 1 is stored in the linear core of transformer 11a shown in FIG. 9. When a pulse from source 30 causes silicon controlled rectifier 21 to be rendered conductive, current $I_1$ through the upper half of primary winding 12 causes energy to be stored in the linear core of transformer 11a. When current no longer flows in primary winding 12, the energy stored in the linear core is returned to the windings causing a voltage to develop across secondary windings 14 and 15. The voltage across windings 14 and 15 causes current to flow so that a charge is stored on capacitors 70 and 71 in the manner described above. Windings 14 and 15 can be connected in series as shown in FIG. 9 to provide a positive polarity at terminal 58 and a negative polarity at terminal 76, or they can be connected in parallel as shown in FIG. 1. Also, a single tapped secondary winding can be used in the transformer 11a shown in FIG. 9. The large value of inductance of transformer 11a may prevent current $I_1$ from increasing to the value of holding current necessary to render the silicon controlled rectifier 21 conductive when a positive voltage pulse is no longer applied to the gate 28. A capacitor 80 and a resistor 81 provide a path for current flow through the rectifier and renders the rectifier conductive until current $I_1$ through the primary winding 12 increases above the value of holding current.

The switching regulator shown in FIGS. 1, 2 and 9 prevents defective regulator components from causing excessively large voltages at the filter output terminals 58 and 59. Prior art power supplies employing series type regulators produce large output voltages when a short circuit develops in the series regulator. These large output voltages may cause serious damage to microcircuit modules which may be connected to the output terminals of the regulators. If a short circuit should develop in silicon controlled rectifiers 21 and 22 of the instant invention, the core of transformer 11 saturates and prevents current from flowing in secondary windings 14 and 15 so that the voltage at output terminals 58 and 59 decreases to zero.

Thus, the objects set forth herein are realized by the instant invention, wherein a novel switching regulator provides electrical isolation between the input and output circuits. This invention eliminates excessively large values of output voltages which may cause damage to a load connected to the regulator and has an efficiency much larger than prior art regulators.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. A switching regulator for us with first and second automatically controlled signal sources and a power supply having a positive terminal and a negative terminal, said circuit comprising: a transformer having a primary winding and a first secondary winding, said primary winding having a center tap; first and second controllable rectifiers each having an anode, a cathode and a gate, said anode of said first rectifier being connected to said positive terminal of said supply, said cathode of said first rectifier being connected to a first end of said primary winding, said first signal source being connected between said gate and said cathode of said first rectifier, said anode of said second rectifier being connected to a second end of said primary winding, said cathode of said second rectifier being connected to said negative terminal of said supply, said second signal source being connected between said gate and said cathode of said second rectifier; first, second and third capacitors, said first capacitor being connected between said positive terminal of said supply and said center tap of said primary winding, said second capacitor being connected between said center tap of said primary winding and said negative terminal of said supply; and a diode having an anode and a cathode, said anode of said diode being connected to a first end of said secondary winding, said third capacitor being connected between said cathode of said diode and a secondary end of said secondary winding.

2. A switching regulator as defined in claim 1 wherein: said first and said second signal sources have a control terminal, said first and said second signal sources each developing output pulses having a frequency determined by the value of a voltage applied to said control terminal;

and said regulator includes means for coupling said control terminal of said first and said second signal sources to said third capacitor.

3. A switching regulator as defined in claim 1 including: an inductor; and a bias supply having first and second terminals and wherein: said transformer has a saturable core and a second secondary winding, said inductor being connected between said first terminal of said bias supply and a first end of said second secondary winding, said second terminal of said bias supply being connected to a second end of said second secondary winding.

4. A switching regulator as defined in claim 1 wherein: said transformer has a saturable core and a second secondary winding; and wherein said switching regulator includes: an inductor; and a means for connecting said inductor between said cathode of said diode and said first end of said second secondary winding, a second end of said second secondary winding being connected to a second end of said first secondary winding.

5. A switching regulator as defined in claim 2 including: an inductor; and a bias supply having first and second terminals and wherein: said transformer has a saturable core and a second secondary winding, said inductor being connected between said first terminal of said bias supply and a first end of said second secondary winding, said second terminal of said bias supply being connected to a second end of said second secondary winding.

6. A switching regulator as defined in claim 3 wherein: a current from said bias supply through said second secondary winding causes said core of said transformer to be saturated when there is an absence of current in said primary winding and wherein: a current in said primary winding causes said core of said transformer to be unsaturated.

7. A switching regulator as defined in claim 3 wherein: said first and said second signal sources have a control terminal, said first and said second signal sources each developing output pulses having a frequency determined by the value of a voltage applied to said control terminal, and wherein: a current from said bias supply through said second secondary winding causes said core of said transformer to be saturated when there is an absence of current in said primary winding, and a current in said primary winding causes said core of said transformer to be unsaturated; and said regulator includes means for coupling said control terminal of said first and said second signal sources to said third capacitor.

8. A switching regulator for use with a power supply having a positive terminal and a negative terminal, said circuit comprising: a transformer having a primary winding and a first secondary winding, said primary winding having a center tap; first and second controllable rectifiers each having an anode, a cathode and a gate, said anode of said first rectifier being connected to said positive terminal of said supply, said cathode of said first rectifier being connected to a first end of said primary winding; first and second signal sources having a control terminal, each of said signal sources having first and second output terminals, each of said signal sources developing output pulses having a frequency determined by the value of a voltage applied to said control terminal, said first output terminal of said first signal source being connected to said gate of said first rectifier, said second output terminal of said first signal source being connected to said cathode of said first rectifier, said anode of said second rectifier being connected to a second end of said primary winding, said cathode of said second rectifier being connected to said negative terminal of said supply, said first output terminal of said second signal source being connected to said gate of said second rectifier, said second output terminal of said second signal source being connected to said cathode of said second rectifier; first, second and third capacitors, said first capacitor being connected between said positive terminal of said supply and said center tap of said primary winding, said second capacitor being connected between said center tap of said primary winding and said negative terminal of said supply; a diode having an anode and a cathode, said anode of said diode being connected to a first end of said first secondary winding, said third capacitor being connected between said cathode of said diode and a second end of said first secondary winding; and means for coupling said third capacitor to said control terminal of said first and said second signal sources so that output pulses developed by said first and said second signal sources each have a frequency determined by the voltage across said third capacitor.

9. A switching regulator as defined in claim 8 including: a third secondary winding; a second diode having an anode and a cathode, said cathode of said second diode being connected to a first end of said third secondary winding; and a fourth capacitor, said fourth capacitor being connected between said anode of said second diode and a second end of said third secondary winding, said third and said fourth capacitors being connected in series.

10. A switching regulator as defined in claim 8 including: a third secondary winding; and a second diode having an anode and a cathode, said anode of said second diode being connected to a first end of said third secondary winding, said cathode of said second diode being connected to said cathode of said first diode, a second end of said third secondary winding being connected to said second end of said first secondary winding and wherein: said transformer has a core with said first and said third secondary windings being wound on opposite halves of said core to cause a current in said first diode to be substantially equal to a current in said second diode.

11. A switching regulator as defined in claim 8 including: an inductor; and a bias supply having first and second terminals and wherein: said transformer has a saturable core; a linear core; and a second secondary winding, said second secondary winding being wound on said saturable core, said primary winding and said first secondary winding each being wound on both said linear core and said saturable core, said inductor being connected between said first terminal of said bias supply and a first end of said second secondary winding, said second terminal of said bias supply being connected to a second end of said second secondary winding.

12. A switching regulator as defined in claim 8 wherein: said transformer has a saturable core; a linear core; and a second secondary winding, said second secondary winding being wound on said saturable core, said primary winding and said first secondary winding each being wound on both said linear core and said saturable core, and wherein said switching regulator includes: an inductor; and a means for connecting said inductor between said cathode of said diode and a first end of said second secondary winding, a second end of said secondary winding being connected to a second end of said first secondary winding.

13. A switching regulator as defined in claim 11 including: a third secondary winding; and a second diode having an anode and a cathode, said anode of said second diode being connected to a first end of said third secondary winding, said cathode of said second diode being connected to said cathode of said first diode, a second end of said third secondary winding being connected to said second end of said first secondary winding, said first and said third secondary windings being wound on opposite halves of said linear and said saturable cores to cause a current in said first diode to be substantially equal to a current in said second diode.

14. A switching regulator as defined in claim 13 wherein: a current from said bias supply through said second secondary winding causes said saturable core to be saturated when there is an absence of current in said primary winding and wherein: a current in said primary winding causes said saturable core to be unsaturated.

(References on following page)

References Cited

UNITED STATES PATENTS

| | | | | |
|---|---|---|---|---|
| 3,119,058 | 1/1964 | Genuit | 321—45 |
| 3,164,767 | 1/1965 | Morgan | 321—45 XR |
| 3,197,691 | 7/1965 | Gilbert | 321—18 |
| 3,263,152 | 7/1966 | Walker | 321—45 |
| 3,319,147 | 5/1967 | Mapham | 321—45 XR |
| 3,348,124 | 10/1967 | Cielo | 321—45 |
| 3,349,315 | 10/1967 | Studtmann | 321—45 |

WILLIAM M. SHOOP, JR., Primary Examiner

U.S. Cl. X.R.

321—18, 45